(12) United States Patent
Acosta et al.

(10) Patent No.: US 10,338,275 B1
(45) Date of Patent: Jul. 2, 2019

(54) FLEXIBLE NANOPHOTONIC META-OPTICS

(71) Applicant: Verily Life Sciences LLC, Mountain View, CA (US)

(72) Inventors: Victor Marcel Acosta, San Francisco, CA (US); James Michael Higbie, Mountain View, CA (US); Supriyo Sinha, Mountain View, CA (US); Eden Rephaeli, Menlo Park, CA (US); Andrew Homyk, Belmont, CA (US); John D. Perreault, Mountain View, CA (US)

(73) Assignee: Verily Life Sciences LLC, Mountain View, CA (US)

( * ) Notice: Subject to any disclaimer, the term of this patent is extended or adjusted under 35 U.S.C. 154(b) by 411 days.

(21) Appl. No.: 15/166,908

(22) Filed: May 27, 2016

Related U.S. Application Data

(60) Provisional application No. 62/167,249, filed on May 27, 2015.

(51) Int. Cl.
    *G02F 1/11* (2006.01)
    *G02B 26/02* (2006.01)
    (Continued)

(52) U.S. Cl.
    CPC ............. *G02B 1/002* (2013.01); *G02B 5/285* (2013.01); *G02B 13/0085* (2013.01);
    (Continued)

(58) Field of Classification Search
    CPC ......... G02F 1/11; G02F 2203/50; G02B 5/20; G02B 5/207; G02B 5/201; G02B 5/208; G02B 5/204; G02B 5/285; G02B 5/206; G02B 26/02; G02B 26/0841; G02B 5/1809; G02B 5/1814; G02B 5/1819; G02B 5/1823; G02B 5/1866; G02B 5/188; G02B 5/1885; G02B 5/1895; G02B 5/1871; G02B 1/002; G02B 1/005; G02B 1/007; G02B 6/0026; G02B 6/107; G02B 6/293;
    (Continued)

(56) References Cited

U.S. PATENT DOCUMENTS

| | | | | |
|---|---|---|---|---|
| 2002/0164105 A1* | 11/2002 | Simpson | ............... | G02B 5/1809 385/11 |
| 2012/0113502 A1* | 5/2012 | Suh | ........................ | G02B 1/002 359/346 |
| 2012/0328240 A1* | 12/2012 | Ma | ........................ | B82Y 20/00 385/33 |

* cited by examiner

*Primary Examiner* — Dawayne Pinkney
(74) *Attorney, Agent, or Firm* — McDonnell Boehnen Hulbert & Berghoff LLP

(57) ABSTRACT

Systems and methods are described that relate to a nanophotonic optical system. The nanophotonic optical system may be configured to transmit light in a range of wavelengths. The nanophotonic optical system includes at least one nanophotonic element, which includes a two-dimensional arrangement of sub-wavelength regions of a first material interspersed within a second material, the first and second materials having different indices of refraction. The at least one nanophotonic element includes a surface having a curvature and an optical phase transfer function dependent on the curvature of the surface. The nanophotonic optical system includes an actuator configured to modify the curvature of the surface and a controller. The controller is configured to determine a threshold optical phase transfer function and cause the actuator to modify the curvature of the surface to provide the threshold optical phase transfer function.

17 Claims, 11 Drawing Sheets

(51) Int. Cl.
*G02F 1/01* (2006.01)
*G02B 26/00* (2006.01)
*G02B 1/00* (2006.01)
*G02B 5/28* (2006.01)
*G02B 27/50* (2006.01)
*G02B 13/00* (2006.01)
*H04N 5/33* (2006.01)
*H04N 5/238* (2006.01)

(52) U.S. Cl.
CPC ........... *G02B 26/002* (2013.01); *G02B 27/50* (2013.01); *H04N 5/238* (2013.01); *H04N 5/332* (2013.01)

(58) Field of Classification Search
CPC .. G02B 6/2953; G02B 27/4244; G02B 27/50; G02B 13/0085; G11B 7/00
USPC ....... 359/285, 286, 227, 231, 279, 290, 291, 359/295
See application file for complete search history.

FLEXIBLE NANOPHOTONIC META-OPTICS

CROSS-REFERENCE TO RELATED APPLICATION

The present non-provisional patent application claims priority to U.S. Provisional Patent Application No. 62/167,249 filed on May 27, 2015, the contents of which are hereby incorporated by reference.

BACKGROUND

Unless otherwise indicated herein, the materials described in this section are not prior art to the claims in this application and are not admitted to be prior art by inclusion in this section.

Optical components that incorporate metamaterial surfaces have been realized using numerical simulation and nanofabrication technologies. Metamaterial surfaces may include sub-wavelength arrangements of materials having different refractive indices. For instance, the sub-wavelength arrangements may include line/grating structures, split ring structures, post structures, and/or "inverse" structures, e.g. holes, trenches, etc. The "critical" dimensions of such structures (e.g. split ring gap, post diameter, etc.) may be 300 nm or less.

SUMMARY

In a first aspect, a nanophotonic optical system for transmitting light in a range of wavelengths including a particular wavelength is provided. The nanophotonic optical system includes at least one nanophotonic element. The at least one nanophotonic element includes a two-dimensional arrangement of sub-wavelength regions of a first material interspersed within a second material, the first material having a first index of refraction and the second material having a second index of refraction. The at least one nanophotonic element includes a surface having a curvature. The at least one nanophotonic element has an optical phase transfer function for transmitting light of the particular wavelength that is dependent on the curvature of the surface. The nanophotonic optical system also includes an actuator configured to controllably modify the curvature of the surface. The nanophotonic optical system additionally includes a controller. The controller is configured to determine a threshold optical phase transfer function and cause the actuator to modify the curvature of the surface so as to provide the threshold optical phase transfer function.

In a second aspect, an optical system is provided. The optical system includes an image sensor, which includes a plurality of superpixels. Each respective superpixel of the plurality of superpixels includes at least a respective first pixel and a respective second pixel. The optical system also includes at least one nanophotonic element optically-coupled to the image sensor. The at least one nanophotonic element has an optical phase transfer function and includes a two-dimensional arrangement of sub-wavelength regions of a first material interspersed within a second material, the first material having a first index of refraction and the second material having a second index of refraction. The at least one nanophotonic element is configured to direct light toward individual superpixels in the plurality of superpixels based on the optical phase transfer function. The at least one nanophotonic element includes a surface having a curvature. The optical phase transfer function is dependent on the curvature of the surface. The at least one nanophotonic element is further configured to direct light toward at least one of the first pixel or second pixel in each individual superpixel based on at least one of a wavelength dependence or a polarization dependence of the optical phase transfer function. The optical system additionally includes an actuator configured to controllably modify the curvature of the surface and a controller. The controller is configured to determine a threshold optical phase transfer function and cause the actuator to modify the curvature of the surface so as to provide the threshold optical phase transfer function.

In a third aspect, a nanophotonic opto-acoustic system is provided. The nanophotonic opto-acoustic system includes at least one nanophotonic element configured to transmit light in a range of wavelengths including a particular wavelength. The at least one nanophotonic element includes a two-dimensional arrangement of sub-wavelength regions of a first material interspersed within a second material, the first material having a first index of refraction and the second material having a second index of refraction. The at least one nanophotonic element includes a surface having a curvature. An optical phase transfer function for transmitting light of the particular wavelength is dependent on the curvature. The surface is configured to deform in response to an acoustic pressure wave. The deformation of the surface modifies the curvature and the optical phase transfer function.

Other aspects, embodiments, and implementations will become apparent to those of ordinary skill in the art by reading the following detailed description, with reference where appropriate to the accompanying drawings.

DETAILED DESCRIPTION

Figure 1:
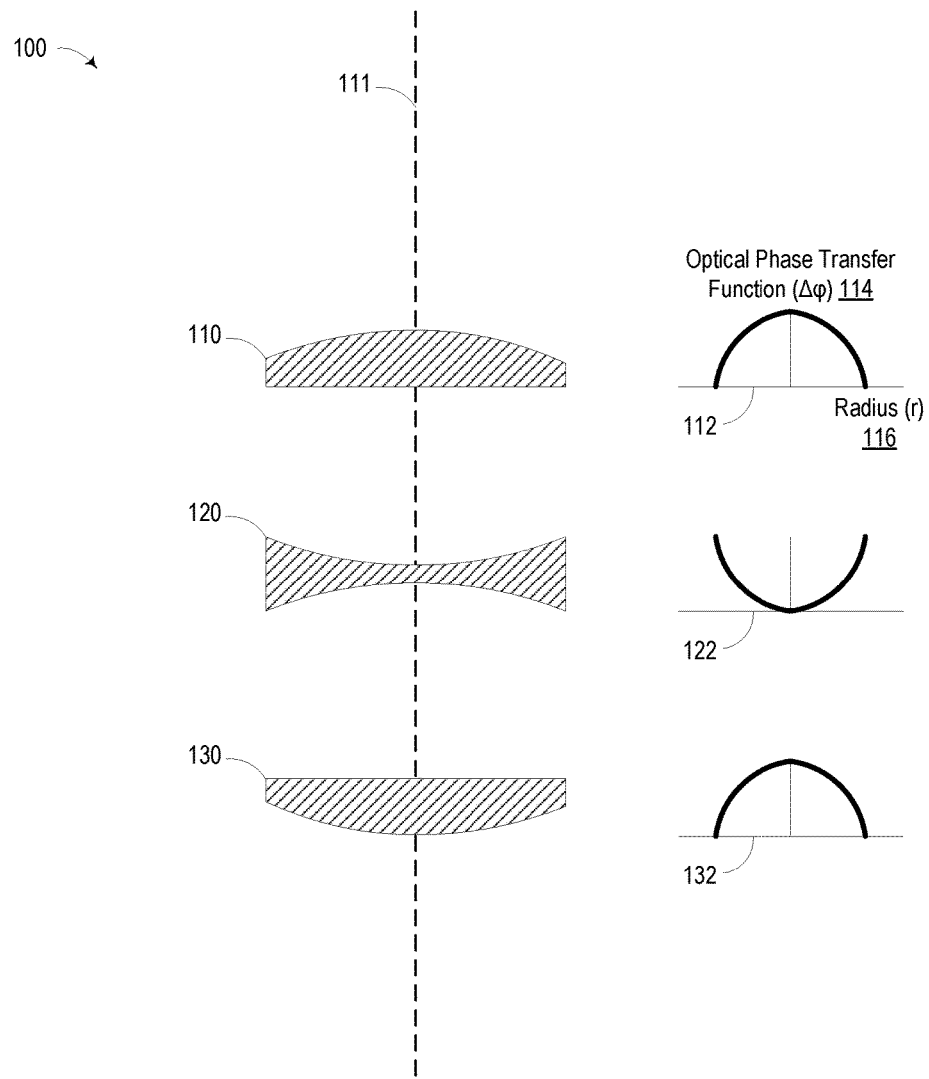
FIG. 1 is a cross-sectional schematic view of multiple refractive elements according to an example embodiment.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

Overview

Metamaterial-based optical components may exhibit characteristics similar to their refractive/reflective optic counterparts. For example, single-element gratings, mirrors, lenses, cavities, vortex beam shapers, polarizing beam splitters, 3D displays, spatial light modulators, and multichromatic lenses have been demonstrated.

Systems and methods disclosed herein describe ways to use one or more metamaterial-based, or nanophotonic, optical elements to achieve imaging with quality comparable to a conventional refractive or reflective optical system. For example, a multiple-element nanophotonic imaging system may offer superior off-axis aberration correction and high numerical aperture compared to a single-element nanophotonic element.

The nanophotonic optical system may be designed and fabricated by combining metamaterial-based optical "building blocks". The building blocks may include nanophotonic elements designed to have properties similar to a corresponding refractive/reflective imaging element group, such as a lens group.

The nanophotonic elements may include materials with varying refractive index. For instance, a first material and a second material may be arranged as a binary phase mask. In an example embodiment, a nanophotonic element may include a first material having a first refractive index (Si, $n_{Si}=4$) and a second material having a second refractive index (air, $n_{air}=1$). The first material and the second material may be interspersed in a two-dimensional arrangement of sub-wavelength regions. For example, the nanophotonic element may include a plurality of cylindrical silicon posts that protrude parallel to an optical axis of the nanophotonic element. Other shapes are possible. For example, the sub-wavelength regions may include posts with an elliptical cross-section.

The sub-wavelength regions and/or structures may include various materials. For instance, the first material (which may form, e.g. the posts) may include diamond, a metal-oxide, a III-V semiconductor, or a different material having high refractive index. Furthermore, the second material may include substances other than air. In an example embodiment, the space between posts may include a dielectric material such as SU-8 polymer, photoresist, polyimide, silicon nitride, or silicon dioxide, among other materials and/or combinations of materials.

The first material and/or the second material may be disposed in a periodic, multiperiodic, and/or an aperiodic array. For example, the plurality of posts may be arranged in a hexagonal close-packed (HCP) array. Other arrangements of the respective regions are possible. For instance, the plurality of posts may be arranged according to a square or diamond-shaped lattice.

The center-to-center distance of structures and/or sub-wavelength regions may be fixed across the nanophotonic element. Alternatively, the center-to-center post distance may vary gradually or abruptly. In yet further embodiments, a plurality of arrays, which may include similar or different periods, may be interspersed on the nanophotonic element.

The size and/or shape of the sub-wavelength regions may be fixed or may vary across the surface. For example, a nanophotonic element may include an HCP array of 200 nm tall silicon posts with nearest-neighbor spacing of 400 nm. In such a scenario, the diameter and shape of the silicon posts may vary based on a position of the respective posts within the array (e.g. along a surface of the nanophotonic element). For example, near a central optical axis of the nanophotonic element, the posts may be cylindrical with a diameter of 200 nm. However, near an outer edge of the nanophotonic element, the posts may have an elliptical cross-section with a long axis distance of 250 nm. Other arrangements, materials, sizes, shapes, and heights are possible.

Although post-like protrusions are described above, other periodic, multiperiodic, and/or aperiodic nanofabricated structures having various geometries, refractive indices, and materials are contemplated herein. For example, a sub-wavelength region of the nanophotonic element may include a plurality of split ring structures along the surface. Alternatively or additionally, a region of the nanophotonic element may include a plurality of holes, trenches, or other types of openings in the surface. Other ways of creating a nanostructured arrangement of various refractive index materials are contemplated as well.

Various arrangements of the sub-wavelength regions on the surface of the respective nanophotonic elements may enable control of the optical phase and optical polarization of light transmitted through the nanophotonic optical system. In an example embodiment, the first material and the second material may be arranged so as to control angular dependence and spectral dependence of light transmitted through the nanophotonic optical system. Additionally or alternatively, the materials may be arranged so as to provide spectral filtering of at least one wavelength or waveband. In an example embodiment, the nanophotonic optical system may selectively transmit light having wavelengths in the visible to near infrared (near-IR) wavelengths, or between 400 nanometers and 2 micrometers.

In an example embodiment, the nanophotonic optical system may be designed based on a combination of optical phase transfer functions of constituent nanophotonic elements. The optical phase transfer function of the constituent nanophotonic element may relate to the phase change of a wavefront of light transmitted through the respective nanophotonic element. For example, a nanophotonic optical system may include three optically-coupled nanophotonic elements, each having a respective optical phase transfer function. The nanophotonic elements and their respective optical phase transfer functions may be designed, selected, or combined such that a spherical aberration is corrected. Other optical aberrations may be corrected or compensated by combining a plurality of nanophotonic elements.

The nanophotonic elements may be optically coupled together so as to combine their optical phase transfer functions, overall optical transfer functions, and/or other optical characteristics. In an example embodiment, the nanophotonic elements may include a substrate handle. The substrate handle may be silicon or another material configured to provide a base for the first and second materials. A portion of the substrate may be etched or otherwise removed, so as to form a window and/or to minimize optical absorption due to the substrate. The remaining substrate may be configured to act as a physical support for the nanophotonic element. The respective substrate handles of each nanophotonic element may be "glued" or otherwise coupled together by application of a coupling material. The coupling material may be, for example, a photo-curable resin, a thermoset resin, a room temperature vulcanization (RTV) silicone, a two-part epoxy, or another type of polymer and/or adhesive material. The coupling material may be applied by a photoresist spinning process. The film thickness of the coupling material, and thus a physical distance between the nanophotonic elements, may be based at least in part on the spin speed (revolutions/sec) at which the coupling material is applied. The coupling material may be photo-cured and/or baked before and/or after coupling with adjacent nanophotonic elements.

While the above embodiments include static nanophotonic elements, dynamic scenarios are also contemplated. For example, a controller and an actuator may enable one or more nanophotonic elements to move with respect to one another. In an example embodiment, the actuator may include a piezoelectric, electrothermal, and/or electromagnetic actuator and the controller could apply an electrical signal to the actuator based on a predetermined position of, or distance between, the respective nanophotonic element(s).

Other types of actuators are possible. For example, the controller may cause one or more voice-coil motors to move the nanophotonic element(s). In an example embodiment, the controller may receive data from an angular velocity sensor. In response to determining that the data indicates a vibration or another movement that may cause an image blur or aberration, the controller may cause the voice-coil motors to move the nanophotonic element(s) so as to reduce or eliminate the effects of potential blur or aberration. In such a manner, the nanophotonic optical system could minimize and/or compensate for camera "shake" or other vibration-related effects.

Alternatively or additionally, the voice-coil motors may be configured to move the nanophotonic element(s) along the central optical axis so as to focus or defocus an image. In other words, the controller may receive data from a passive or active autofocus sensor. In response to determining that the data is indicative of a focus adjustment, the controller may cause the voice-coil motors to move the nanophotonic element(s) accordingly, e.g. to achieve proper focus of a field of view.

Various strategies and methods may be utilized to design a nanophotonic optical system. A first technique may emulate existing refractive/reflective lens designs using nanophotonic lens elements. For example, the method may determine, for each refractive element of a refractive optical system, an optical phase transfer function or another type of optical characteristic. The optical phase transfer function may represent the change in optical properties, e.g. phase, as an optical wavefront propagates or is transmitted through the refractive/reflective lens element. After determining the optical phase transfer function for the refractive lens element, an analogous nanophotonic element may be designed based on the determined optical phase transfer function. For instance, the analogous nanophotonic elements may use structured building blocks to achieve the same, or similar, optical phase transfer profile. The unit cell of such a building block may include a plurality of high refractive index posts with varying diameter and/or position to control transmitted phase and other optical properties, e.g. polarization.

In an example embodiment, a nanophotonic optical system may be designed to be analogous to a Cooke triplet lens. A Cooke triplet lens includes a refractive lens with a negative diopter "sandwiched" between two refractive lenses with a positive diopter. In a similar fashion, the respective nanophotonic elements may be designed and fabricated to have analogous optical power to their refractive counterparts. As described above, the nanophotonic elements may include a sub-wavelength arrangement of materials with different refractive indices. The materials may be arranged on the nanophotonic elements so as to match the optical power and/or other optical characteristics of the corresponding individual refractive lens elements of the Cooke triplet. Furthermore, the method may include optically-coupling the nanophotonic elements (e.g. arranging in a coaxial fashion) by physically gluing or otherwise coupling the rigid portions of the nanophotonic lens elements.

A second design technique may use inverse optimization to computationally solve for one or more nanophotonic elements that will achieve a threshold, or a desirable, image quality in a nanophotonic optical system. For example, the method may include determining a merit function needed to achieve a threshold image quality output from the nanophotonic optical system. The merit function may incorporate desirable values or ranges for various optical characteristics, such as: focus spot size, working distance, acceptance angle, aberration thresholds, linewidth resolution, and/or other figures of merit or transfer characteristics. In some example embodiments, the merit function may represent an optical transfer function of the nanophotonic optical system. Using finite-difference time and frequency domain (FDTD, FDFD) algorithms, the merit function may be used as one or more boundary conditions to create a desired three-dimensional dielectric profile. The three-dimensional dielectric profile may include one or more nanophotonic elements. Similar to the above embodiments, nanophotonic elements having the desired dielectric profile may be fabricated and optically-coupled to form nanophotonic optical system that exhibits the threshold image quality output.

The threshold image quality of light transmitted through the nanophotonic optical system may include an image having a predetermined diffraction-limited spatial resolution with a finite working distance. Alternatively or additionally, the threshold image quality of light may include a predetermined spatial distribution of light based on at least one of wavelength or polarization, e.g. a prism. Yet further, the threshold image quality of light may include predetermined correction of an optical aberration, such as a spherical aberration. In an example embodiment, the threshold image quality of light may include an image of a scene being focused to a predetermined diffraction-limited spatial resolution and the image being corrected for optical aberrations. Other threshold image quality metrics and characteristics are possible and contemplated herein.

Determining the merit function may establish certain boundary conditions, limits, formulas, and/or equations so as to realize the threshold image quality of light transmitted through the nanophotonic optical system. In an example embodiment, determining the merit function may establish a predetermined maximum spatial resolution metric and/or a predetermined maximum optical distortion metric. Other types of threshold metrics may be established when determining the merit function.

The nanophotonic elements described herein may be incorporated into optical systems configured for imaging. For example, an objective lens may focus light onto a nanophotonic element. The nanophotonic element, in turn, may be optically-coupled to an image sensor. The image sensor may include a plurality of pixels, which may be grouped and/or associated into a plurality of superpixels. In other words, each superpixel may include at least two pixels of the plurality of pixels.

The nanophotonic element may be configured to direct light towards individual superpixels according to an optical phase transfer function. The optical phase transfer function may describe how light is modified and/directed as it transits the nanophotonic element. As described above, the nanophotonic element may include a two-dimensional arrangement of sub-wavelength regions of a first material interspersed within a second material, the first material having a first index of refraction and the second material having a second index of refraction. Light passing through the at least one nanophotonic element may be directed toward at least one of the first pixel or second pixel in each individual superpixel based on at least one of a wavelength dependence or a polarization dependence of the optical phase transfer function. That is, the nanophotonic element may direct light towards different locations based on a property of the light, e.g. wavelength and/or polarization.

In some embodiments, the at least one nanophotonic element may be configured to direct light having a particular characteristic towards more than one pixel in a superpixel. For example, light having a first wavelength may be directed toward a discernible pattern of pixels of a superpixel. In such an example, light having a second wavelength may be directed towards a different pattern of pixels in the superpixel. The various patterns of pixels may form an orthonormal basis such that illumination of light on a particular pattern of pixels may be mapped back to the particular characteristic, or set of characteristics (e.g. wavelength, incident angle, polarization, etc.). Put another way, light having various wavelengths (or other optical characteristics) may be directed towards multiple patterns that include one or more pixels of the superpixel. These multiple patterns may spatially overlap, at least in part. Thus, this disclosure is not limited to non-overlapping spectral-to-spatial intensity pixel patterns.

Optical systems that include the nanophotonic elements may be thin and flexible. For example, the nanophotonic elements may each be less than a micron thick and even a plurality of nanophotonic elements may be less than ~10 microns thick. Such optical systems may have bend radii of 1 centimeter or less.

Such flexibility and bendability may provide an optical designer with further degrees of freedom in addition to those based on nanophotonic patterning of sub-wavelength structures. In forming a curved optical surface, the refractive properties of the optical surface may change. That is, "optical power" may be applied to light so as to cause it to focus or diverge. In an example embodiment, such bending of the optical surface may provide optical power to a nanophotonic optical system with less wavelength dependence. The decreased dependence on wavelength may be desirable for imaging applications and systems.

In some examples, a nanophotonic optical system may combine wavelength-scale patterning and curved surfaces to create a "division of labor". In other words, the wavelength-scale patterning may be utilized, at least in part, to separate light into different wavelengths and the curved surface may be used, again at least in part, to focus and defocus light.

In an example embodiment, a curvature of a surface of at least one nanophotonic element may be configured to be finite (non-zero). In such a scenario, the optical properties of the nanophotonic element may depend on the curvature of the surface. For example, a nanophotonic element may have converging or diverging optical properties based, at least in part, on the curvature of its surface.

Furthermore, because the contemplated nanophotonic elements can be very thin (on the order of a wavelength of transmitted light), the curvature of the surface may be configured to be "curvable", bendable, stretchable, or otherwise adjustable. As such, a nanophotonic element and/or a nanophotonic optical system having an adjustable curvature may enable adjustable optical power, focus, field of view, etc.

In example embodiments, nanophotonic elements having an adjustable curvature may additionally or alternatively modify other optical characteristics of the nanophotonic optical system. For instance, changing the curvature of a nanophotonic element may change a focus position of a particular wavelength of transmitted light. Alternatively or additionally, such a curvature change may adjust the spectral range of wavelengths reflected and/or transmitted by the nanophotonic optical system.

The curvature of the nanophotonic elements may be adjusted by an actuator and an associated controller. For example, the actuator may include piezoelectric material and the controller may cause at least one dimension of the material to expand and/or contract based on an electrical signal delivered to the material. Other types of actuators are possible.

The nanophotonic optical systems described herein may enable a variety of imaging applications within the visible to near-IR wavelengths. For example, a multi-element nanophotonic optical system may provide imaging capabilities without relatively bulky refractive/reflective lens assemblies. Additionally or alternatively, a nanophotonic optical system may provide improved imaging capabilities for small-form factor cameras, e.g. smart phone camera objectives, other consumer electronic devices.

In an example embodiment, the nanophotonic optical systems described herein may be configured such that they correct for spherical and chromatic aberrations similar to microscope objectives. The nanophotonic optical systems may include a plurality of photonic elements, which may provide spectral filtering capabilities, e.g. via a dielectric thin-film Bragg stack. In an example embodiment, the spectral filtering may enable fluorescence imaging, e.g. by providing a high level of rejection of major frequencies of excitation light while allowing efficient transmission of one or more fluorescence wavelengths.

The flexible nanophotonic optical systems may provide improved performance or new capabilities in a number of areas. For example, the optical systems described herein may provide flexible lenses for wearable sensors. Flexible lenses may be used to provide, for example, improved fields of view and image quality. Such improvements may be utilized in optical sensing techniques that gather physiological information, e.g. photoplethysmography, speckle contrast imaging, fluorescence and reflectance-based sensors, etc.

In some embodiments, a flexible nanophotonic optical system may include at least one flexible nanophotonic element optically coupled to a flexible image sensor. In another embodiment, a light-based microphone may be provided. The flexible nanophotonic optical system may be very sensitive to auditory vibrations, which may be associated with an acoustic sound pressure level. That is, the flexible membrane may deflect based on receiving an acoustic signal with high RMS intensity. In such a scenario, a deaf (but not blind) person may wear a special eye contact that may be configured to transduce very loud sounds (of any pitch) into image distortions.

Other applications of the flexible nanophotonic optical system may include a far-sighted lens. Traditional refractive lens systems require a positive, or convex, lens. However, the shape of the eye generally requires contact lenses to be naturally concave. A flexible nanophotonic optical system may be curved in such a way as to provide far-sighted accommodation within a contact lens.

Further example embodiments include bumpless bifocal contact lenses. Currently, refractive optic-based bifocal contact lenses may include a portion with a different radius of curvature from the remainder of the contact lens. This bump can be irritating and/or annoying to a user. A nanophotonic optical system may eliminate or reduce the need for such differences in radius of curvature.

As described herein, nanophotonic optical systems may provide wavelength-dependent focusing and/or optical phase transfer functions. Accordingly, it is contemplated that such nanophotonic optical systems may enable humans to perceive light having wavelengths outside the visible spectrum by frequency upconversion, downconversion, spatial-separation, or other techniques. For instance, a contact lens with an incorporated nanophotonic optical system, an infrared-absorbing material, and a display may be configured to provide a viewable image to a user indicative of a scene within the infrared wavelengths. Other wavebands are contemplated and other ways to form a perceivable image for a wearer of a contact lens incorporating a nanophotonic optical system are possible.

Yet further, higher order image correction may be enabled with the currently described nanophotonic optical systems. For example, contact lenses that include nanophotonic optical systems may provide correction for astigmatism, coma, or spherical aberrations.

Additionally, flexible nanophotonic optical systems may provide dynamically-tunable optical elements. For example, by changing the curvature of a diffractive surface, various zoom, focus, tilt-shift, depth of field, and other optical imaging effects may be adjusted. In such a manner, nanophotonic optical systems may enable such features in cell phone cameras, portable displays, and/or miniature microscopes, etc.

System Examples

FIG. 1 is a cross-sectional schematic view of multiple refractive elements 100 according to an example embodiment. The multiple refractive elements 100 may include a first refractive element 110, a second refractive element 120, and a third refractive element 130. The respective refractive elements 110, 120, and 130 may include various refractive optical materials, such as glass, polycarbonate, plastic, or other optical materials. The respective refractive elements 110, 120, and 130 may be configured to transmit light at least within the visible and near infrared (near IR) wavelength range, e.g. 400 nm to 2 µm.

In an example embodiment, a combination of the respective refractive elements 110, 120, and 130 may represent a Cooke triplet, which is a commonly-used refractive lens combination. The Cooke triplet can enable a reduction in various image aberrations, such as spherical aberrations.

The respective refractive elements 110, 120, and 130 may have respective optical phase transfer functions 114. The respective optical phase transfer functions 114 may relate to how one or more properties of light are modified upon being transmitted through the respective refractive elements 110, 120, and 130. For cylindrically or circularly-symmetric refractive elements, the optical phase transfer functions 114 may depend on a radius 116. The radius 116 may represent a distance from a central optical axis 111.

In an example embodiment, the first refractive element 110 may modify a phase of an optical wavefront 112 to a greater extent along the central optical axis 111 as compared to phase modification at the edges of the first refractive element 110. In other words, the first refractive element 110 may include a positive diopter, such as a converging lens having optical power. Furthermore, the second refractive element 120 may modify a phase of an optical wavefront 122 to a lesser extent along the central optical axis 111 as compared to phase modification at the edges of the second refractive element 120. Thus, the second refractive element 120 may include a negative diopter, such as a diverging lens having optical power.

Yet further, the third refractive element 130 may modify a phase of an optical wavefront 132 to a greater extent along the central optical axis 111 as compared to phase modification at the edges of the third refractive element 130.

FIG. 1 illustrates one of many different refractive element groupings or combinations contemplated herein. For example, contemplated refractive lens groupings may include more or fewer optical elements. Such groupings may include elements having zero optical power and/or positive or negative diopter. Furthermore, such groupings may include elements that may provide spectral and/or polarization-dependent filtering or spatial transmission (e.g. a prism).

Figure 2:
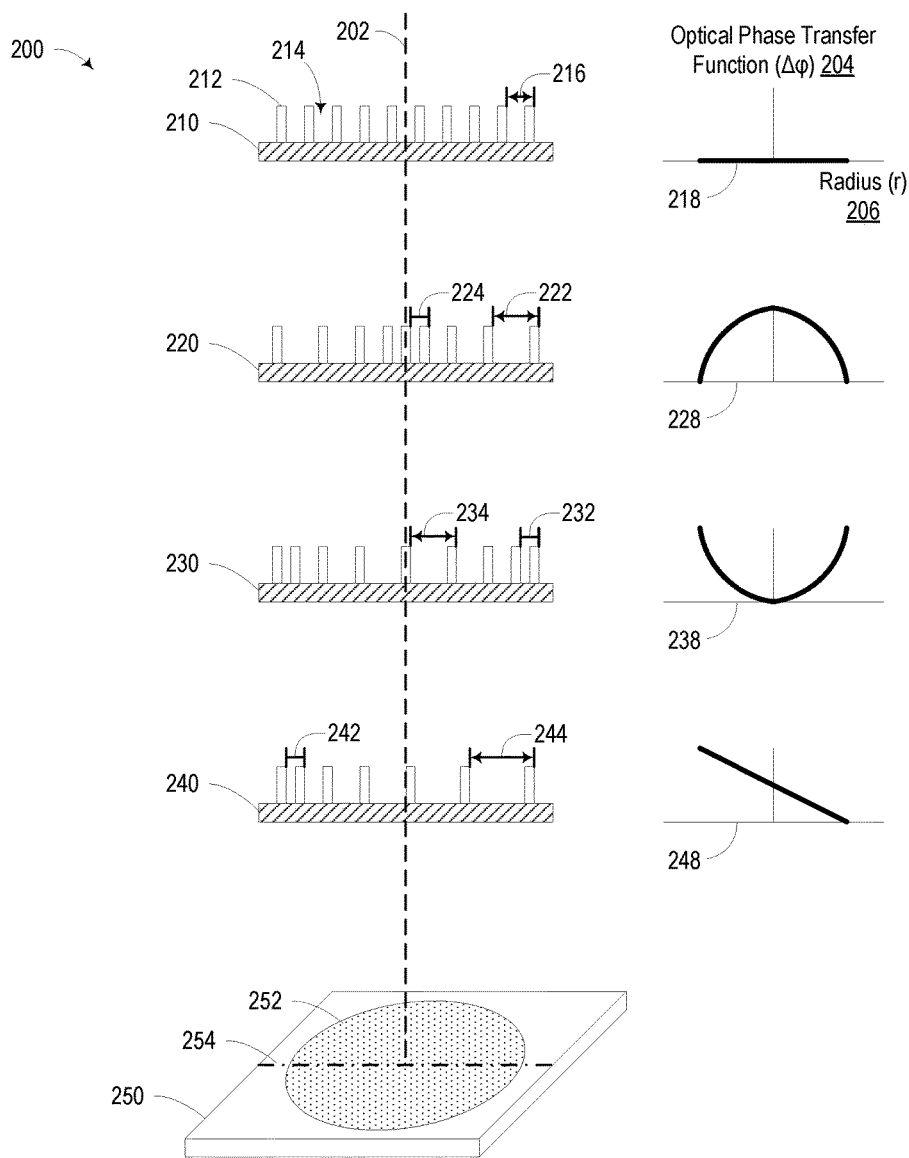
FIG. 2 is a cross-sectional schematic view of multiple nanophotonic elements according to an example embodiment.

FIG. 2 is a cross-sectional schematic view of multiple nanophotonic elements 200 according to an example embodiment. The multiple nanophotonic elements 200 may include a first nanophotonic element 210, a second nanophotonic element 220, a third nanophotonic element 230, and a fourth nanophotonic element 240.

The multiple nanophotonic elements 200 may include various arrangements of materials having different refractive indices. For example, a first nanophotonic element 210 may include a first material 212 arranged in a post-like geometry and a second material 214 that may be arranged between the posts. The first material 212 may include a metal, silicon, or another high-index material relative to the second material 214. The first material 212 may be a single material or may include a combination of constituent materials. The second material 214 may include air, silicon dioxide, or another low refractive index material relative to the first material 212. The second material 214 may include one or more constituent materials and may include a dielectric material.

Although some examples herein describe post-like structures, it will be understood that other sub-wavelength structures are possible. For example, split-ring structures, elliptical structures (e.g. post-like structures with elliptical cross-sections), and other sub-wavelength geometries are contemplated herein.

The respective nanophotonic elements 210, 220, 230, and 240 may have an optical phase transfer function 204. As described above, the optical phase transfer function 204 may relate to how one or more properties of light are modified upon being transmitted through the respective nanophotonic elements 210, 220, 230, and 240. The optical phase transfer function 204 may depend upon an arrangement of the first and second materials on the respective nanophotonic elements 210, 220, 230, and 240. In some examples described herein, the optical phase transfer function 204 may depend on a radial position 206 relative to a central optical axis 202.

Nanophotonic element 250 is an oblique angle representation of elements similar or identical to the respective nanophotonic elements 210, 220, 230, and 240. In some embodiments, a patterned area 252 may represent a metamaterial surface configured to modify one or more properties of light impinging on the metamaterial surface.

In an example embodiment, the first material 212 may be arranged in a post-like structure with a fixed period 216 along a surface of the first nanophotonic element 210. For example, the first material 212 may be arranged as posts with a fixed period 216 independent of a radial position relative a central optical axis 202. As such, an optical phase transfer function 218 may be zero and/or include a fixed phase delay for light transmitted through the first nanophotonic element 210, without regard to position.

In another embodiment, a second nanophotonic element 220 may include the post-like structures arranged such that a period decreases with decreasing radius relative to the central optical axis 202. For example, an outer radius period 222 may be larger than an inner radius period 224. Such an arrangement may provide an optical phase transfer function 228 with a relatively larger phase delay for transmitted light near the central optical axis 202 as compared to transmitted light near an outer radius of the nanophotonic element 220.

In a further embodiment, a third nanophotonic element 230 may include the post-like structures arranged such that a period increases with decreasing radius relative to the central optical axis 202. For example, an outer radius period 232 may be smaller than an inner radius period 234. Such an arrangement may provide an optical phase transfer function 238 with a relatively smaller phase delay for transmitted light near the central optical axis 202 as compared to transmitted light near an outer radius of the nanophotonic element 230.

In yet another embodiment, a fourth nanophotonic element 240 may include the post-like structures arranged such that a period increases as moving from left to right along an axis 254. For example, a left-side period 242 may be less than a right-side period 244. As such, the arrangement may provide an optical phase transfer function 248 that is greater for regions along a left-side of the axis 254 as compared to areas along a right-side of the axis 254.

Other arrangements of the post-like structures are possible. As described herein, the post-like structures may additionally or alternatively represent split-ring structures, "inverse" structures and/or hole or trench structures. Furthermore, although example embodiments that include fixed or slowly-varying periods are described above, it should be recognized that arrangements of sub-wavelength features having abruptly-changing periods, multiple periods and/or pseudo-random (aperiodic) arrangements are possible.

Figure 3:
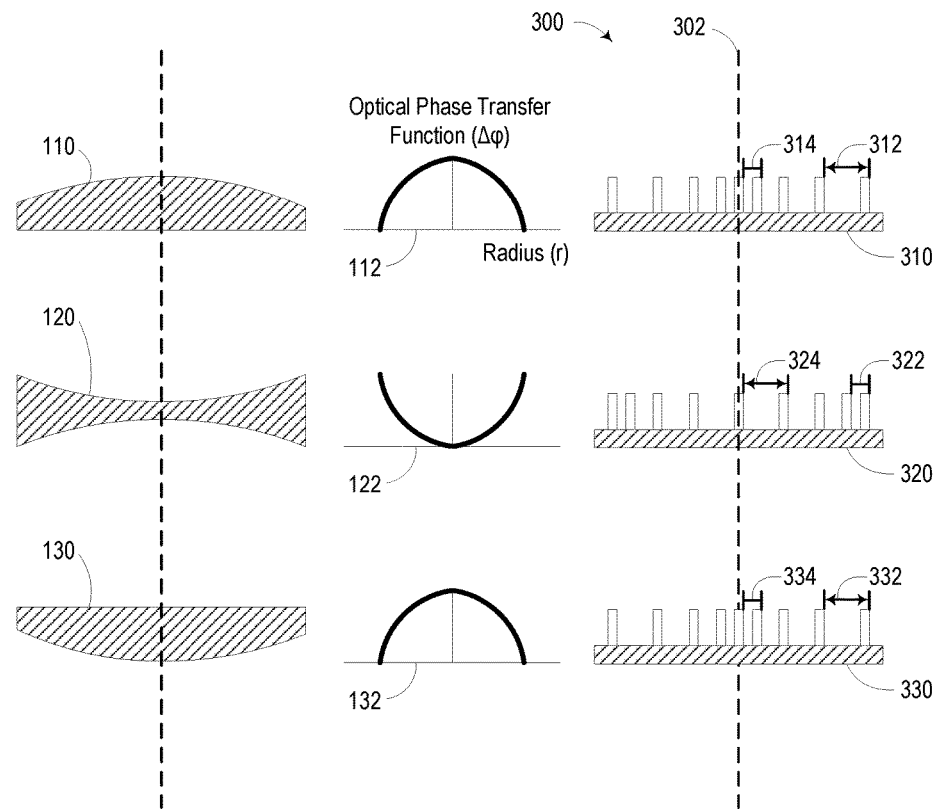
FIG. 3 is a cross-sectional schematic view of a nanophotonic optical system according to an example embodiment.

FIG. 3 is a cross-sectional schematic view of a nanophotonic optical system 300 according to an example embodiment. The multiple refractive elements may include refractive elements illustrated and described in reference to FIG. 1. The multiple nanophotonic elements may be similar or identical to the nanophotonic elements illustrated and described in reference to FIG. 2.

In an example embodiment, refractive elements 110, 120, and 130 may have respective phase transfer functions 112, 122, and 132. As described elsewhere, the refractive elements 110, 120, and 130 may be arranged in a Cooke triplet refractive lens grouping. The refractive elements 110, 120, and 130 may have respective phase transfer functions 112, 122, and 132. Namely, the refractive elements 110, 120, and 130 may have different diopters or optical powers. Furthermore, the physical arrangement and combination of the diopters of refractive elements 110, 120, and 130 may enable a reduction of various optical aberrations, such as a spherical aberration.

Nanophotonic elements 310, 320, and 330 may correspond to refractive elements 110, 120, and 130. That is, nanophotonic elements 310, 320, and 320 may be designed, fabricated, and/or otherwise configured to have optical characteristics of the respective corresponding refractive elements 110, 120, and 130. Specifically, a two-dimensional arrangement of materials having sub-wavelength dimensions and different refractive indices in the respective nanophotonic elements 310, 320, and 330 may provide similar or identical optical phase transfer functions to their refractive element counterparts.

In an example embodiment, nanophotonic elements 310 and 330 may be configured to have a positive diopter or optical power. In such a scenario, nanophotonic elements 310 and 330 may include a periodic arrangement of post structures of a first material interspersed within a second material. The periodic arrangement of posts may include a periodicity that increases with respect to an increasing radial distance from a central optical axis 302. For instance, nanophotonic elements 310 and 330 may have respective outer region periods 312 and 332, which may be larger as compared respective inner region periods 314 and 334. As such, the nanophotonic elements 310 and 330 may be configured to act as converging lenses.

Nanophotonic element 320 may be configured to have a negative diopter or optical power. In such a scenario, a periodic arrangement of posts on nanophotonic element 320 may include a periodicity that decreases with respect to an increasing radial distance from a central optical axis 302. For instance, nanophotonic element 320 may have an outer region period 322, which may be smaller as compared respective inner region period 324. As such, the nanophotonic element 320 may be configured to act as a diverging lens.

A combination of the nanophotonic elements 310, 320, and 330 may be configured to have optical characteristics similar or identical to the corresponding refractive optical system, e.g. the Cooke triplet lens group.

Figure 4A:
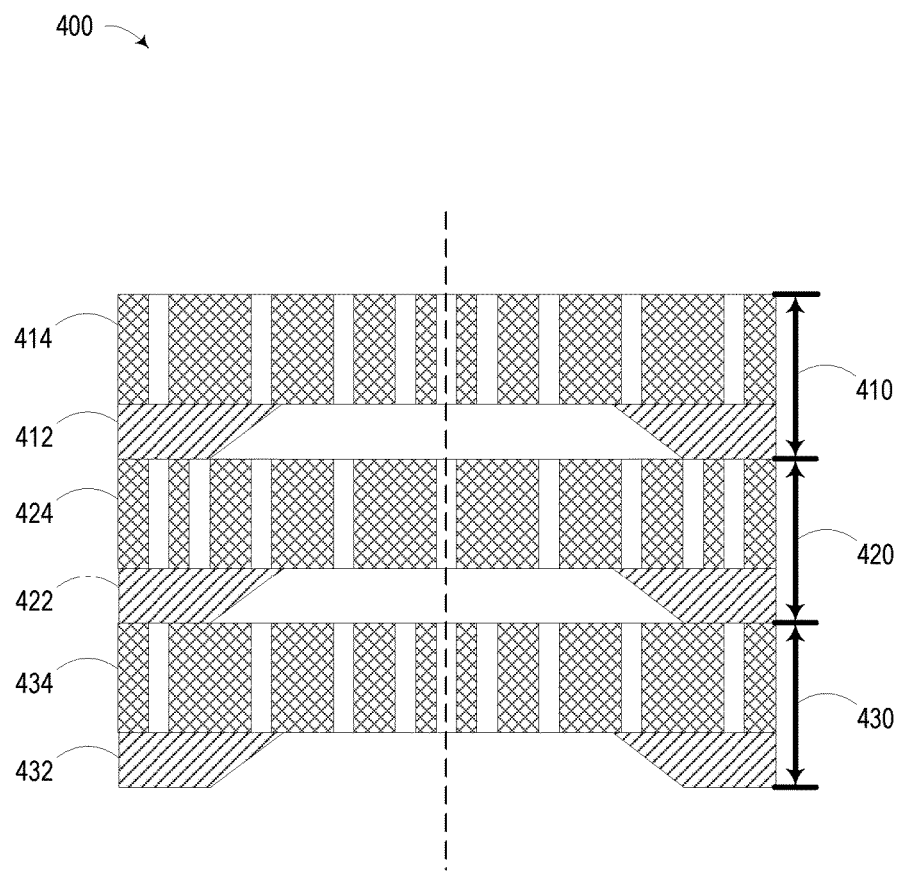
FIG. 4A is a cross-sectional schematic view of a nanophotonic optical system according to an example embodiment.

FIG. 4A is a cross-sectional schematic view of a nanophotonic optical system 400 according to an example embodiment. The nanophotonic optical system 400 may include nanophotonic elements 410, 420, and 430, which may be similar or identical to the corresponding nanophotonic elements 310, 320, and 330 as illustrated and described in reference to FIG. 3.

The nanophotonic elements 410, 420, and 430 may each include a substrate handle. The respective substrate handles 412, 422, and 432 may include silicon or a different material. The substrate handles 412, 422, and 432 may be configured to provide physical support for the materials in the nanophotonic elements 410, 420, and 430.

The substrate handles 412, 422, and 432 may be "glued" or otherwise physically-coupled via a coupling material 414 or another type of adhesive material. In some embodiments, a fixed distance between nanophotonic elements may be defined and/or maintained based on a thickness of the coupling material 414.

Alternatively, one or more of the nanophotonic elements may be mounted in a holder configured to maintain a position with respect to the other nanophotonic elements in the nanophotonic optical system.

Figure 4B:
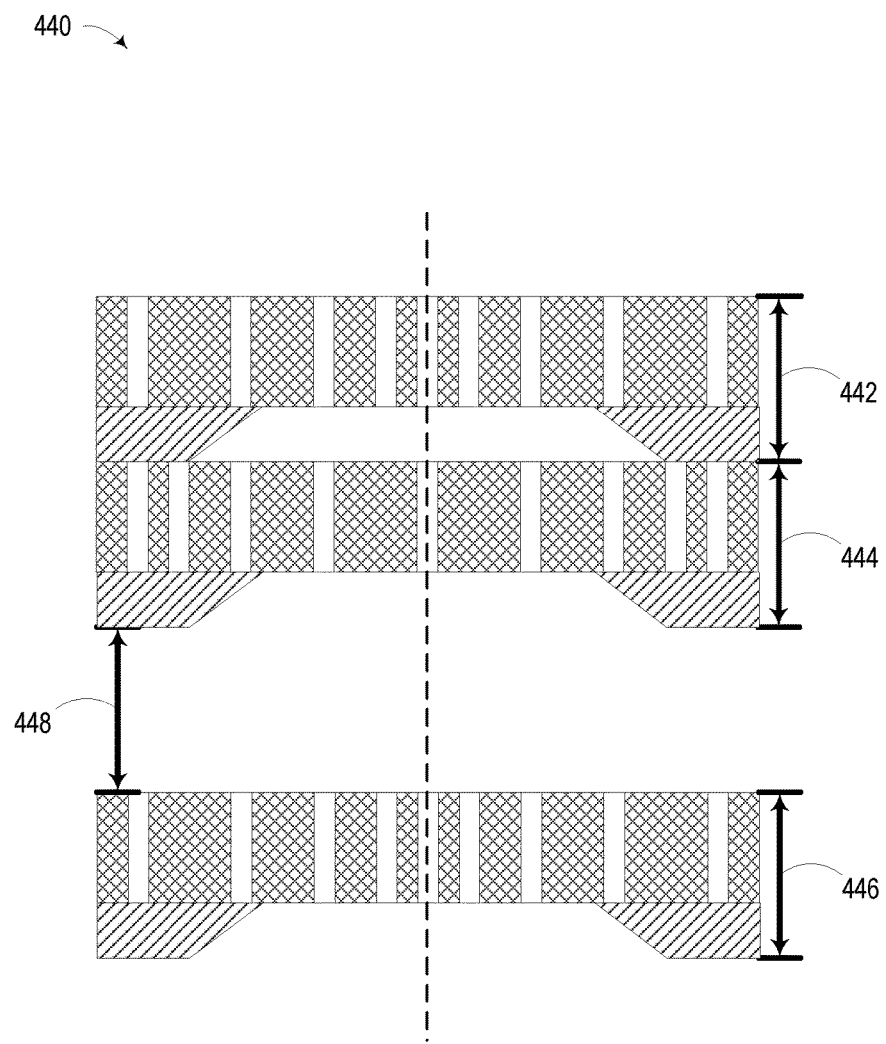
FIG. 4B is a cross-sectional schematic view of a nanophotonic optical system according to an example embodiment.

FIG. 4B is a cross-sectional schematic view of a nanophotonic optical system 440 according to an example embodiment. In the example embodiment, a first nanophotonic element 442 and a second nanophotonic element 444 may be configured to move relative to a third nanophotonic element 446. A distance 448 between the nanophotonic elements 444 and 446 may be controllably adjusted with an actuator and a controller. Such controllable adjustment may enable focusing, zooming, and/or other variations in optical characteristics of the nanophotonic optical system.

Figure 4C:
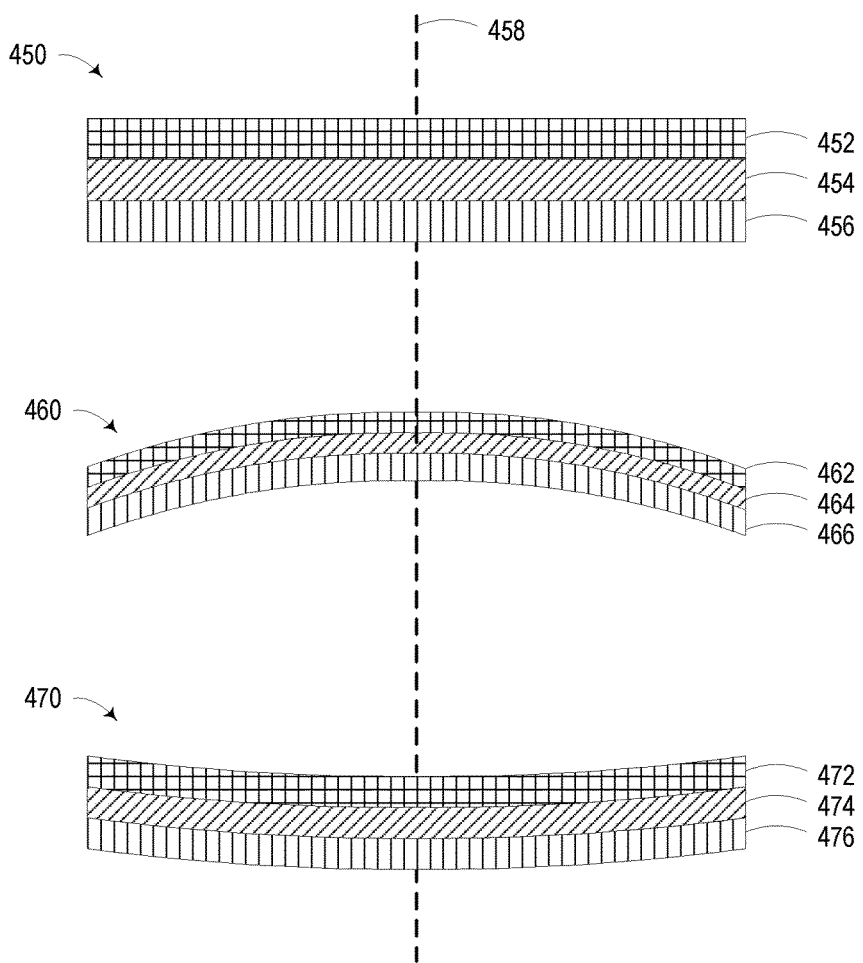
FIG. 4C is a cross-sectional schematic view of multiple nanophotonic optical systems according to an example embodiment.

FIG. 4C is a cross-sectional schematic view of nanophotonic optical systems 450, 460, and 470 according to an example embodiment. A first nanophotonic optical system 450 may include nanophotonic elements 452, 454, and 456. The first nanophotonic optical system 450 may include a curvature of zero with respect to a central optical axis 458.

A second nanophotonic optical system 460 may include nanophotonic elements 462, 464, and 466. The second nanophotonic optical system 460 may include a raised central portion such that the second nanophotonic optical system 460 has a positive curvature with respect to the central optical axis 458.

A third nanophotonic optical system 470 may include nanophotonic elements 472, 474, and 476. The second nanophotonic optical system 470 may include a raised outer portion such that the third nanophotonic optical system 470 has a negative curvature with respect to the central optical axis 458.

In an example embodiment, the overall optical power of the nanophotonic optical system may be adjusted by changing the curvature of the nanophotonic elements. For instance, in some embodiments, a negative curvature may indicate positive optical power and a positive curvature may indicate negative optical power. Adjusting the curvature of the nanophotonic optical system 460 and 470 may modify other optical characteristics of the light transiting the optical system.

Figure 5A:
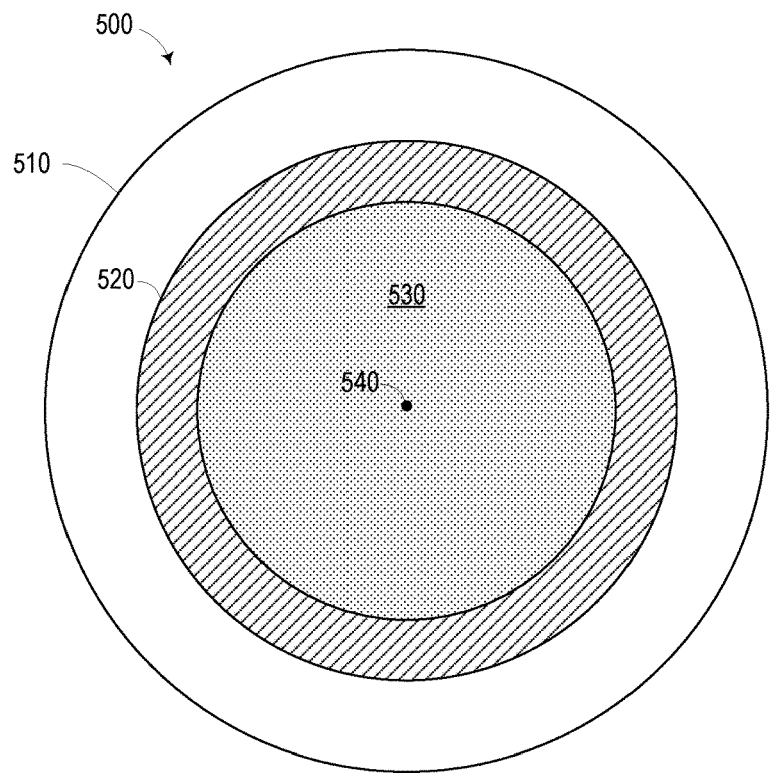
FIG. 5A is a top view of an optical system according to an example embodiment.
Figure 5B:
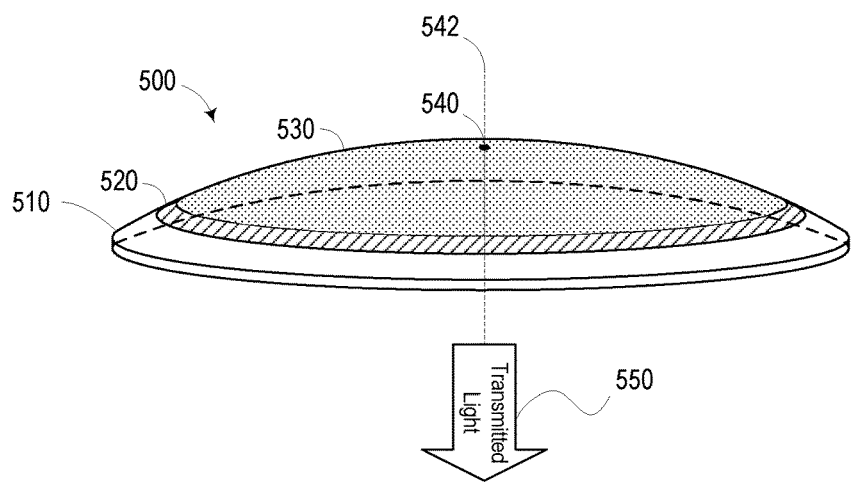
FIG. 5B is an oblique view of an optical system according to an example embodiment.

FIG. 5A is a top view of an optical system 500 according to an example embodiment. FIG. 5B is an oblique view of the optical system 500. The optical system 500 may include a contact lens body 510. The contact lens body 510 may provide a structural and/or biocompatible coating for a nanophotonic element 530. The contact lens body 510 may be rigid or flexible and may include various materials such as silicone hydrogel and various plastic materials. Other materials are possible. The nanophotonic element 530 may be coupled and/or supported, at least in part, by a substrate handle 520.

A central optical axis 542 may be defined as passing through a central location 540 of the contact lens body 510 and nanophotonic element 530. Various wavelengths of light may be transmitted through the optical system 500. Transmitted light 550 may be modified according to an optical phase transfer function of the nanophotonic element 530 and/or the contact lens body 510. The nanophotonic element 530 may be curved according to a curvature of the contact lens body 510. Alternatively or additionally, the nanophotonic element 530 may have a different curvature. In an example embodiment, the nanophotonic element 530 may be flexible. That is, the curvature of the nanophotonic element 530 may "flex" or deform along with the contact lens body 510.

Figure 6A:
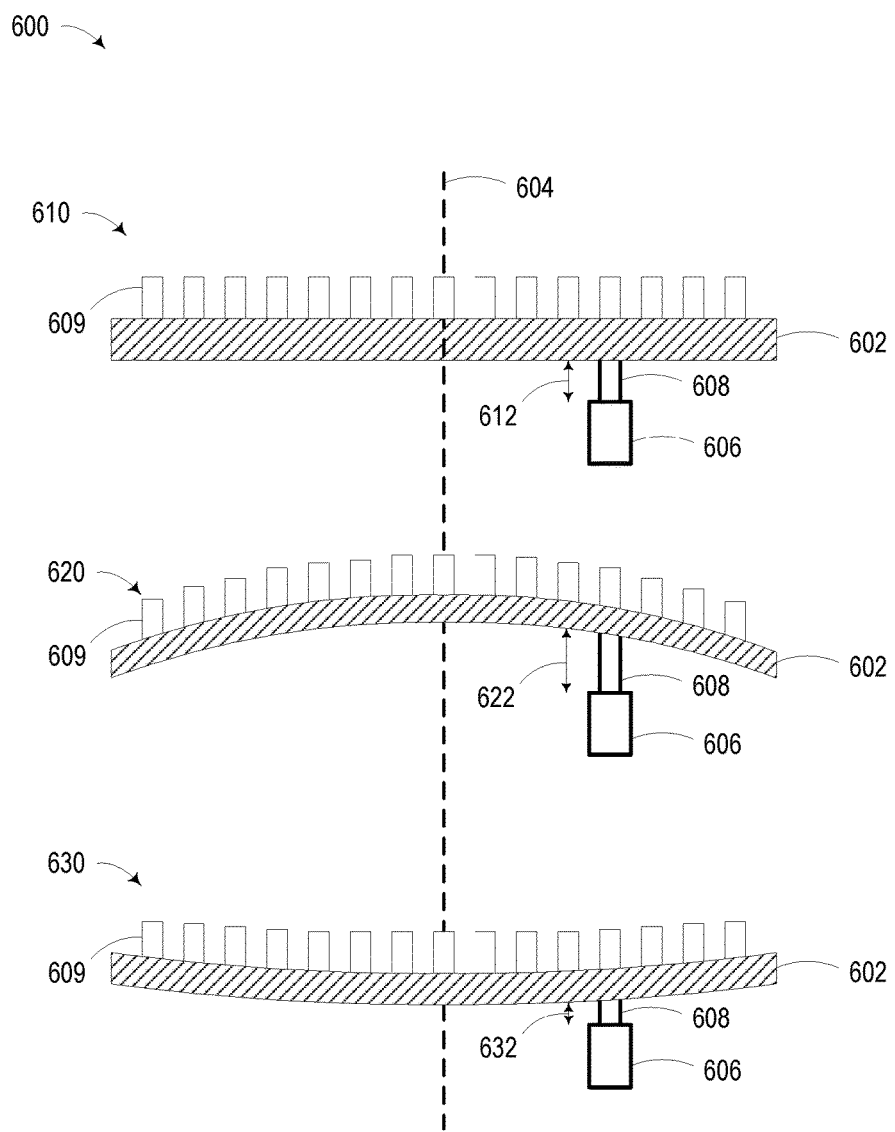
FIG. 6A is a cross-sectional view of an optical system according to an example embodiment.

FIG. 6A is a cross-sectional view of an optical system 600 according to an example embodiment. FIG. 6A illustrates several scenarios 610, 620, and 630, which may describe various states of the optical system 600. For example, scenarios 610, 620, and 630 may illustrate a substrate handle 602 that may provide at least partial physical support for an array of sub-wavelength features 609. The array of subwavelength features 609 may be configured to be radially symmetric about a central optical axis 604. Alternatively, the array of subwavelength features 609 may be asymmetric with respect to the central optical axis 604.

The optical system 600 may include an actuator. The actuator may include an actuator body 606 and an actuator arm 608. The actuator body 606 and/or the actuator arm 608 may operate as an electromagnetic actuator and/or a piezoelectric actuator. That is, a piezoelectric material may be incorporated into the actuator arm 608. In such a scenario, a controller may provide an electrical signal so as to move the actuator arm 608 to a predetermined position and/or to provide a predetermined force. The controller may cause the actuator arm 608 to various lengths so as to adjust a curvature of a surface of the nanophotonic element, e.g. a curvature of the sub-wavelength features 609. Other ways to provide mechanical force to the substrate handle 602 and/or the array of sub-wavelength features 609 are contemplated herein.

Scenario 610 illustrates the actuator arm 608 extended to a first length 612. In such a scenario, the substrate 602 and/or the array of sub-wavelength features 609 may be flat. In other words, under such a condition, a surface of the nanophotonic element may have no curvature. While the actuator arm 608 is extended to the first length 612, the nanophotonic element and/or the optical system may have a first optical phase transfer function.

Scenario 620 illustrates the actuator arm 608 extended to a second length 622. In such a scenario, the substrate 602 and/or the array of sub-wavelength features 609 may be curved. In other words, under such a condition, a surface of the nanophotonic element may have a finite, positive curvature, for example with respect to an image sensor. While the actuator arm 608 is extended to the second length 622, the nanophotonic element and/or the optical system may have a second optical phase transfer function. In an example embodiment, the second optical phase transfer function may provide a positive optical power similar to a converging refractive lens.

Scenario 630 illustrates the actuator arm 608 extended to a third length 632. In such a scenario, the substrate 602 and/or the array of sub-wavelength features 609 may be curved. In other words, under such a condition, a surface of the nanophotonic element may have a finite, negative curvature, for example with respect to an image sensor. While the actuator arm 608 is extended to the third length 632, the nanophotonic element and/or the optical system may have a third optical phase transfer function. In an example embodiment, the third optical phase transfer function may provide a negative optical power similar to a diverging refractive lens.

While scenarios 610, 620, and 630 illustrate modifying an optical power, other characteristics of the optical phase transfer function of the optical system may be adjusted by changing the curvature of the optical system. For example, a waveband of a spectral filter of the optical system may be adjusted by changing the curvature. Alternatively or additionally, a spatial separation of various wavelengths may be adjusted by changing the curvature. Other ways to adjust one or more properties of the optical phase transfer function based on the curvature of the nanophotonic element are contemplated herein.

Figure 6B:
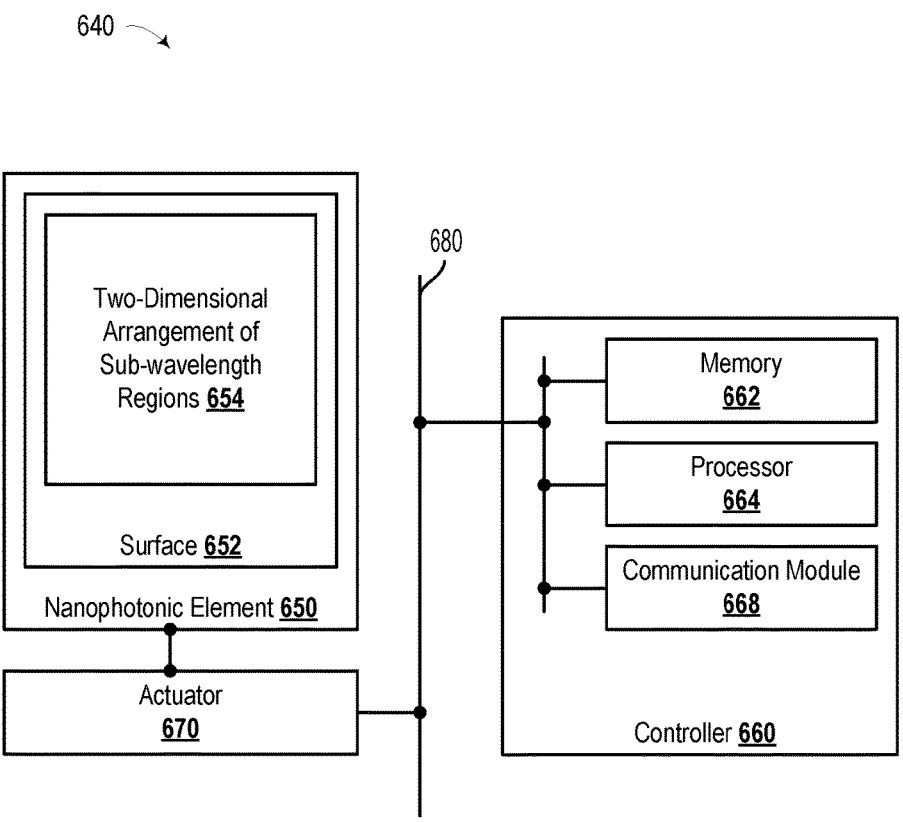
FIG. 6B is a schematic diagram of an optical system according to an example embodiment.

FIG. 6B is a schematic diagram of an optical system 640 according to an example embodiment. The optical system 640 may include at least one nanophotonic element 650. The nanophotonic element 650 may include a two-dimensional arrangement of sub-wavelength regions 654, which may be disposed along a surface 652. The nanophotonic element 650 may have a curvature that may be controllably modified via an actuator 670. In other words, the actuator 670 may be configured to controllably modify the curvature of the surface 652. The actuator 670 may controlled by controller 660 via a wired or wireless interface 680. The controller 660 may optionally include a memory 662 and a processor 664. The controller 660 may also optionally include a communication module 668 configured to provide the wired or wireless interface 680.

The controller 660 may handle signals in an analog and/or a digital manner. In an example embodiment, the controller 660 may include an analog control system. However, the controller may additionally or alternatively include a control system based, at least in part, on digital signal processing. Furthermore, the controller 660 may optionally include a feedback control system. For example, the controller 660 may receive information from multiple image sensors (or different portions of the same image sensor) as part of a phase detection process. In response to the information, the controller 660 may perform or cause a focusing function or another type of imaging adjustment function.

The processor 664 may be configured to execute instructions. The instructions may include determining a threshold optical phase transfer function. That is, the controller 660 may receive information indicative of an initial optical phase transfer function. For example, an image sensor may provide an image indicative of a blurred and/or defocused image. In response, the controller 660 may determine the threshold optical phase transfer function based on reducing or eliminating the blur or defocus of the image. In other words, the controller 660 may determine that changing a curvature of the nanophotonic element 650 may improve or otherwise adjust the image quality of the optical system 640. In some embodiments, determining the threshold optical phase transfer function may include determining a change in curvature of the surface so as to achieve at least a threshold image quality of light as described herein. For example, determining the threshold optical phase transfer function may include determining a curvature so as to achieve a predetermined maximum spatial resolution metric and/or a predetermined maximum optical distortion metric.

The controller 660 may cause the actuator to modify the curvature of the surface so as to provide the threshold optical phase transfer function. For instance, the controller 660 may provide an electrical signal to the actuator 670 via the interface 680. In response to the electrical signal, the actuator 670 may change a force and/or a position relative to the nanophotonic element 650 so as to change the curvature of the surface 652.

In an example embodiment, modifying the curvature of the surface 652 may change a focal distance of the nanophotonic element 650 and/or the optical system 640. Additionally or alternatively, modifying the curvature of the surface 652 may change a field of view of the nanophotonic element 650 and/or the optical system 640. Modifying the curvature of the surface 652 may change other aspects of the optical phase transfer function of the nanophotonic element 650 and/or the optical system 640. For instance, modifying the curvature of surface 652 may eliminate or reduce the effects of coma, astigmatism, and/or spherical aberrations. In another embodiment, a change in the curvature of surface 652 may cause a colorshift in the transmitted light. In other words, a change in the curvature of surface 652 may blue-shift or red-shift the transmitted light. Other optical effects and corresponding adjustments are contemplated herein.

Figure 7:
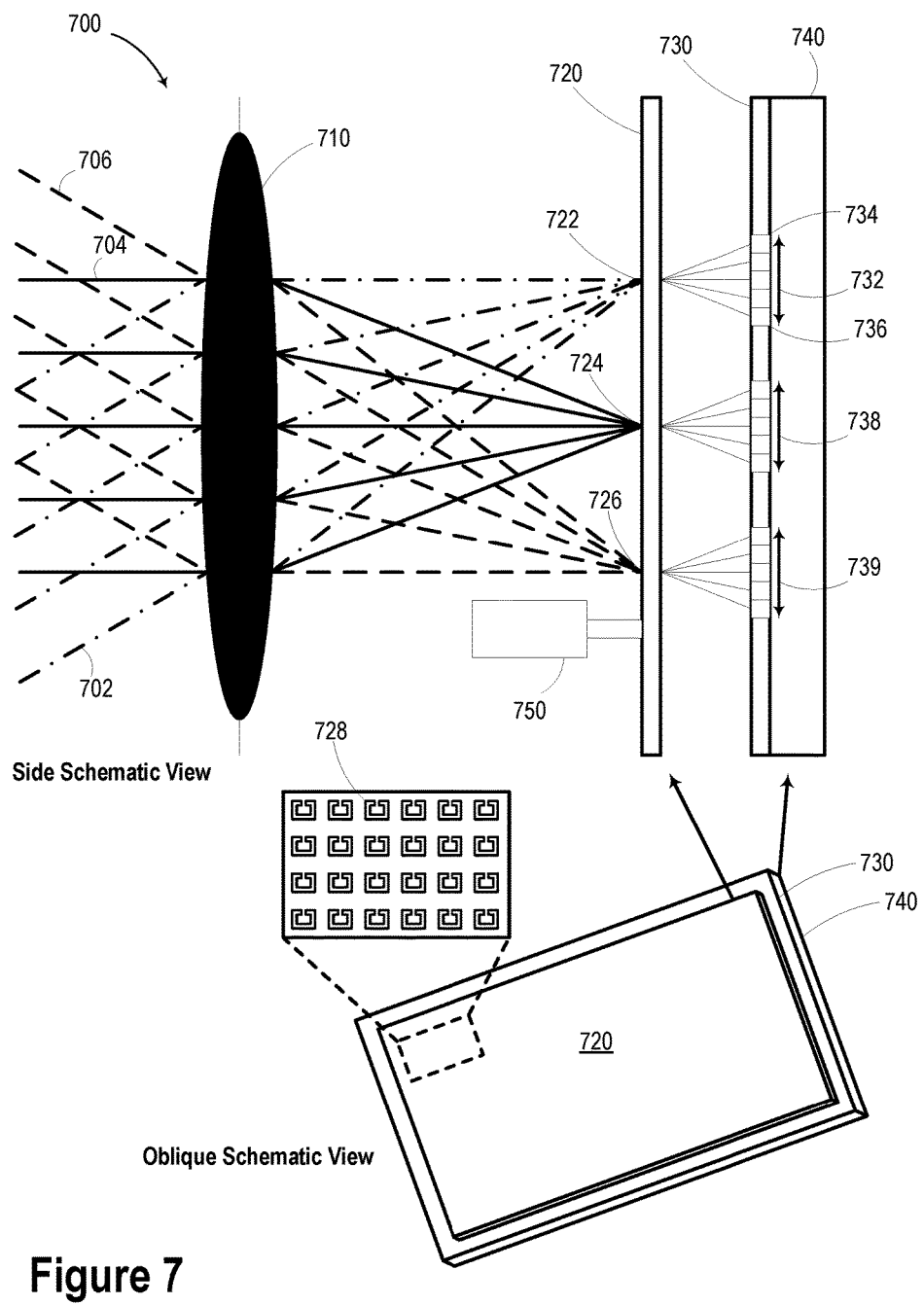
FIG. 7 is a side view and an oblique angle view of an optical system according to an example embodiment.

FIG. 7 is a side view and an oblique angle view of an optical system 700 according to an example embodiment. Optical system 700 includes an objective lens 710, at least one nanophotonic element 720, an image sensor 730, and, optionally, a read-out integrated circuit (ROIC) 740. The objective lens 710 may include a refractive optical lens or a nanophotonic element, which may be similar to other nanophotonic elements described herein. The objective lens 710 may be configured to focus light along a focal plane based on an angle of incidence of the light. In an example embodiment, the objective lens 710 may focus light onto the nanophotonic element 720. For instance, light 702, which is incident upon the objective lens 710 at an upward angle, may be focused at focal point 722 along the nanophotonic element 720. Additionally, light 706, which is incident upon the objective lens 710 at a downward angle, may be focused at focal point 726. Furthermore, light 704, which is normally incident to the objective lens 710, may be focused at focal point 724.

The image sensor 730 may include a plurality of superpixels 732, 738, and 739. Each superpixel may include at least two pixels. For example, superpixel 732 may include a first pixel 734 and a second pixel 736. Superpixels with more constituent pixels, e.g. a 5×5 array of pixels, are considered herein.

As described above, the nanophotonic element 720 may include an optical phase transfer function and may include a two-dimensional arrangement of subwavelength regions 728 of materials with different refractive indices. Furthermore, the nanophotonic element 720 may be configured to direct light towards a respective superpixel of the plurality of superpixels. The nanophotonic element 720 may be further configured to direct light toward at least one of the first pixel 734 or a second pixel 736 in each individual superpixel based on, e.g. wavelength or polarization of the light and the optical phase transfer function.

In an example embodiment, the optical phase transfer function of the at least one nanophotonic element 720 may have a wavelength dependence. For instance, the nanophotonic element 720 may include a two-dimensional arrangement of sub-wavelength regions configured to provide a first optical phase transfer function for the first wavelength and a second optical phase transfer function for the second wavelength. In such a scenario, the at least one nanophotonic element 720 may be configured to direct light having a first wavelength toward the first pixel 734. Also, the at least one nanophotonic element 720 may be configured to direct light having a second wavelength toward the second pixel 736 in each individual superpixel.

In another example embodiment, the optical phase transfer function of the at least one nanophotonic element 720 may have a polarization dependence. For instance, the nanophotonic element 720 may include a two-dimensional arrangement of sub-wavelength regions configured to provide a first optical phase transfer function for the first polarization and a second optical phase transfer function for the second polarization. In such a scenario, the at least one nanophotonic element may be configured to direct light having a first polarization toward the first pixel 734. Also, the at least one nanophotonic element may be configured to direct light having a second polarization toward the second pixel 736 in each individual superpixel. In other words, the at least one nanophotonic element may be configured to (i) direct light having a first polarization toward the first pixel in each individual superpixel and (ii) direct light having a second polarization toward the second pixel in each individual superpixel.

The optical system 700 may further include an actuator 750 configured to controllably modify a curvature of the at least one nanophotonic element 720. In such a scenario, the optical system 700 and/or the nanophotonic element 720 may have an optical phase transfer function. A controller, which may be controller 660, may provide a signal to actuator 750 so as to cause a curvature of the nanophotonic element 720 to change. As such, the optical phase transfer function of the nanophotonic element 720 and/or the optical system 700 may be adjusted according to a threshold optical phase transfer function while still providing wavelength- and/or polarization-dependent spatial dispersion/diffraction.

Figure 8:
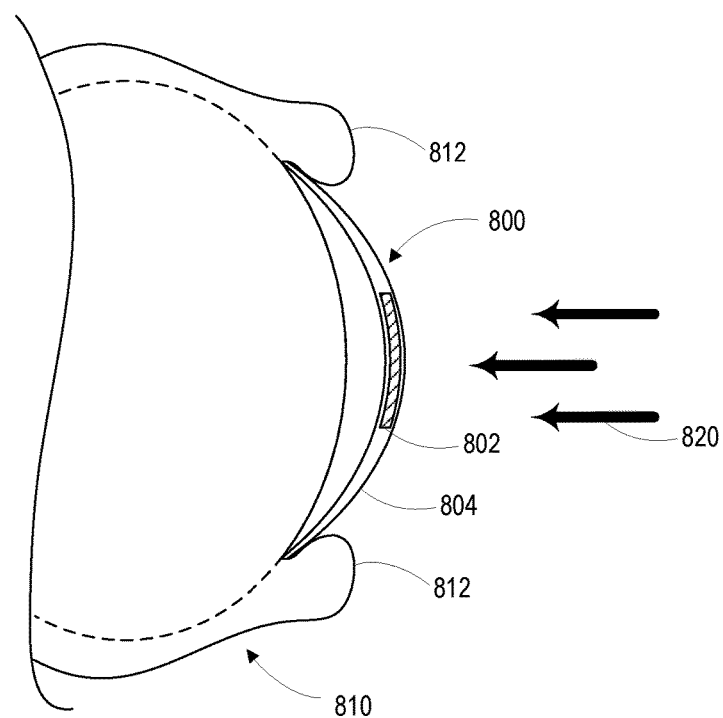
FIG. 8 is a cross-sectional view of a nanophotonic opto-acoustic system according to an example embodiment.

FIG. 8 is a cross-sectional view of a nanophotonic opto-acoustic system 800 according to an example embodiment. The nanophotonic opto-acoustic system 800 may include at least one nanophotonic element 802 and a contact lens body 804. In some embodiments, the contact lens body 804 may provide a shaped biocompatible material, which may encapsulate the nanophotonic element 802. The nanophotonic opto-acoustic system 800 may be configured to be worn on an eye 810 such that the nanophotonic opto-acoustic system 800 may receive acoustic pressure waves 820, e.g. while eyelids 812 are open. The acoustic pressure waves 820 may have an associated sound pressure level (SPL).

As described elsewhere herein, the nanophotonic element 802 may be flexible. Furthermore, the nanophotonic element 802 may have an optical phase transfer function that may be modified based on a curvature of a surface of the nanophotonic element 802. In an example embodiment, the surface of the nanophotonic element 802 may be configured to deform in response to an acoustic pressure wave. Accordingly, a deformation of the surface may modify the curvature and the optical phase transfer function of the nanophotonic element 802 and/or the nanophotonic opto-acoustic system 800. In such a scenario, a deaf (but not blind) individual may wear the nanophotonic opto-acoustic system 800 as a contact lens. The deaf individual may be able to perceive various acoustic pressure waves based on an optical distortion of a field of view. In other words, the person's view may become increasingly distorted (e.g. blurred and/or defocused) in response to increasing amplitudes of acoustic pressure waves. In another embodiment, a deformation of the nanophotonic element 802 may cause a colorshift effect on the light transmitted through it. In such a scenario, a person's view may become "red-shifted" or "blue-shifted" in response to an acoustic pressure wave interacting with the nanophotonic element 802. In such embodiments, the nanophotonic opto-acoustic system 800 may provide a visual means for deaf individuals to obtain auditory information.

As described elsewhere herein, the nanophotonic opto-acoustic system 800 may also include a controller and an image sensor (not shown). In such a scenario, the image sensor and controller may be configured to provide a way to optically transduce an acoustic pressure wave. For example, the controller may receive a first signal via the image sensor. The first signal may be a calibration or initial sound pressure level measurement. Subsequently, a second signal may be received while the surface of the nanophotonic element 802 is deformed. The controller may determine a sound pressure level based on a difference between the first signal and the second signal. For example, the nanophotonic element 802 may become increasingly deformed in response to an increasing sound pressure level. In such a scenario, a sound pressure level may be determined based on relative image distortions compared to the initial calibration or sound pressure level measurement. Alternatively or additionally, non-linear effects, such as the nanophotonic element 802 becoming resonantly deformed according to a beat frequency of acoustic pressure waves interacting with the nanophotonic element 802, are considered. For example, the controller may be configured to determine a sound pressure level and/or frequency based on a characteristic distortion (e.g. a concentric ring-like blurring, or spherical aberration) of an image. Alternatively, in the scenario in which the deformation of the nanophotonic element 802 causes a colorshift of the transmitted light, the controller may be configured to determine a sound pressure level based on an amount of colorshift. Other ways to optically transduce acoustic waves based on a deformation of a flexible nanophotonic element are contemplated herein.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A nanophotonic optical system for transmitting light in a range of wavelengths including a particular wavelength, comprising:
   at least one nanophotonic element, wherein the at least one nanophotonic element comprises a two-dimensional arrangement of sub-wavelength regions of a first material interspersed within a second material, the first material having a first index of refraction and the second material having a second index of refraction, wherein the at least one nanophotonic element comprises a surface having a curvature, and wherein the at least one nanophotonic element has an optical phase transfer function for transmitting light of the particular wavelength that is dependent on the curvature of the surface;
   an actuator configured to controllably modify the curvature of the surface; and
   a computing device configured to:
   determine a threshold optical phase transfer function; and
   cause the actuator to modify the curvature of the surface so as to provide the threshold optical phase transfer function.

2. The nanophotonic optical system of claim 1, wherein the actuator comprises at least one of: a piezoelectric, an electrothermal, or an electromagnetic actuator.

3. The nanophotonic optical system of claim 1, wherein modifying the curvature of the surface modifies a focal distance of the at least one nanophotonic element.

4. The nanophotonic optical system of claim 1, wherein modifying the curvature of the surface modifies a field of view of the at least one nanophotonic element.

5. The nanophotonic optical system of claim 1, wherein the two-dimensional arrangement of sub-wavelength regions comprises at least one of a periodic, quasi-periodic, or multiperiodic arrangement of the first material interspersed within the second material.

6. The nanophotonic optical system of claim 1, wherein the two-dimensional arrangement of sub-wavelength regions comprises a binary phase mask.

7. The nanophotonic optical system of claim 1, wherein the at least one nanophotonic element comprises a plurality of nanophotonic elements, wherein each nanophotonic element comprises a substrate handle, wherein the substrate handles of the plurality of nanophotonic elements are physically coupled via a coupling material, wherein a spacing between each nanophotonic element is based on a thickness of the coupling material.

8. The nanophotonic optical system of claim 1, wherein the sub-wavelength regions of the first material comprise at least one of: a plurality of post structures, a plurality of split ring structures, or a plurality of holes.

9. The nanophotonic optical system of claim 8, wherein a cross-section of at least one post structure of the plurality of post structures comprises an ellipse, wherein the cross-section is along a plane substantially parallel to the at least one nanophotonic element.

10. The nanophotonic optical system of claim 1, wherein the first material comprises at least one of: silicon (Si), diamond, a metal oxide, or a III-V semiconductor, and wherein the second material comprises air.

11. The nanophotonic optical system of claim 1, wherein the at least one nanophotonic element comprises a first nanophotonic element and a second nanophotonic element, and wherein the first and second nanophotonic elements are movable relative to each other.

12. An optical system comprising:
    an image sensor comprising a plurality of superpixels, wherein each respective superpixel of the plurality of superpixels comprises at least a respective first pixel and a respective second pixel; and
    at least one nanophotonic element optically-coupled to the image sensor, wherein the at least one nanophotonic element has an optical phase transfer function and comprises a two-dimensional arrangement of sub-wavelength regions of a first material interspersed within a second material, the first material having a first index of refraction and the second material having a second index of refraction, wherein the at least one nanophotonic element is configured to direct light toward individual superpixels in the plurality of superpixels based on the optical phase transfer function, wherein the at least one nanophotonic element comprises a surface having a curvature, wherein the optical phase transfer function is dependent on the curvature of the surface, and wherein the at least one nanophotonic element is further configured to direct light toward at least one of the first pixel or second pixel in each individual superpixel based on at least one of a wavelength dependence or a polarization dependence of the optical phase transfer function;
    an actuator configured to controllably modify the curvature of the surface; and
    a computing device configured to:
        determine a threshold optical phase transfer function; and
        cause the actuator to modify the curvature of the surface so as to provide the threshold optical phase transfer function.

13. The optical system of claim 12, wherein the actuator comprises at least one of: a piezoelectric, an electrothermal, or an electromagnetic actuator.

14. The optical system of claim 12, wherein modifying the curvature of the surface modifies a focal distance of the at least one nanophotonic element.

15. The optical system of claim 12, wherein modifying the curvature of the surface modifies a field of view of the at least one nanophotonic element.

16. The optical system of claim 12, wherein the two-dimensional arrangement of sub-wavelength regions comprises at least one of a periodic, quasi-periodic, or multiperiodic arrangement of the first material interspersed within the second material.

17. The optical system of claim 12, wherein the two-dimensional arrangement of sub-wavelength regions comprises a binary phase mask.

* * * * *